No. 839,018. PATENTED DEC. 18, 1906.
T. MIDGLEY.
VEHICLE WHEEL.
APPLICATION FILED JULY 1, 1905.

UNITED STATES PATENT OFFICE.

THOMAS MIDGLEY, OF HARTFORD, CONNECTICUT.

VEHICLE-WHEEL.

No. 839,018.        Specification of Letters Patent.        Patented Dec. 18, 1906.

Application filed July 1, 1905. Serial No. 267,999.

*To all whom it may concern:*

Be it known that I, THOMAS MIDGLEY, a citizen of the United States, residing in the city and county of Hartford, in the State of Connecticut, have invented new and useful Improvements in Vehicle-Wheels, of which the following is a specification.

This invention relates to vehicle-wheels, and particularly to tires and rims for such wheels.

One important object of the present invention is to provide a rim and resilient tire for vehicle-wheels of such construction that the tire may be very quickly and easily applied to the wheel and may be securely held thereon.

A further object of the invention is to provide a resilient tire and securing devices therefor of such construction that the tire may be securely held upon the wheel without inclosing any considerable portion of the rubber or other resilient material of which the tire is made in a channel, thereby decreasing the amount of rubber or other resilient material required to produce a certain degree of cushioning effect.

A further object of the invention is to provide a resilient tire and securing devices therefor of simple, serviceable, and inexpensive construction and which may be easily applied to a wheel-felly of the ordinary type without altering the felly.

With the above objects in view and others which will hereinafter appear the invention consists in certain features of construction, combination, and arrangement of parts, all of which are hereinafter described, illustrated in the accompanying drawings, and are clearly pointed out in the appended claims.

Figure 1:
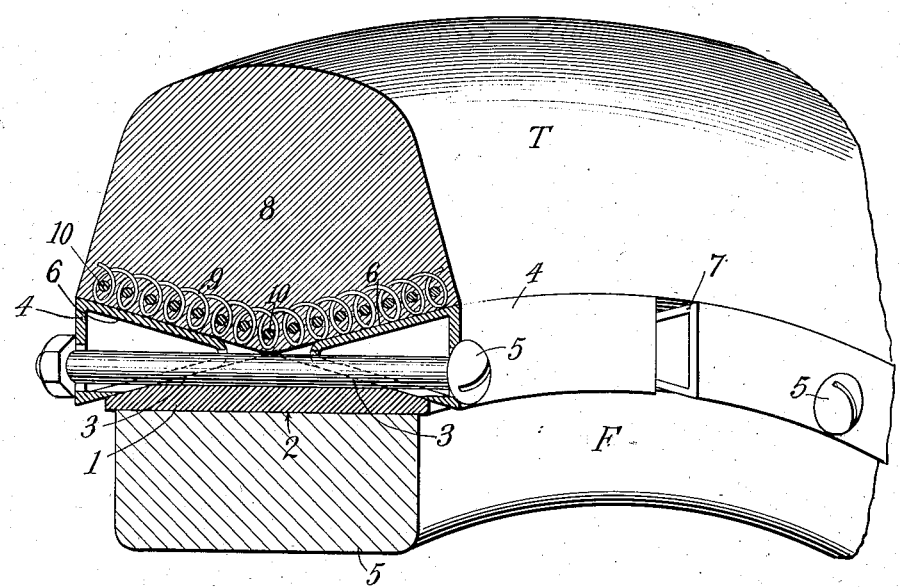
Figure 2:
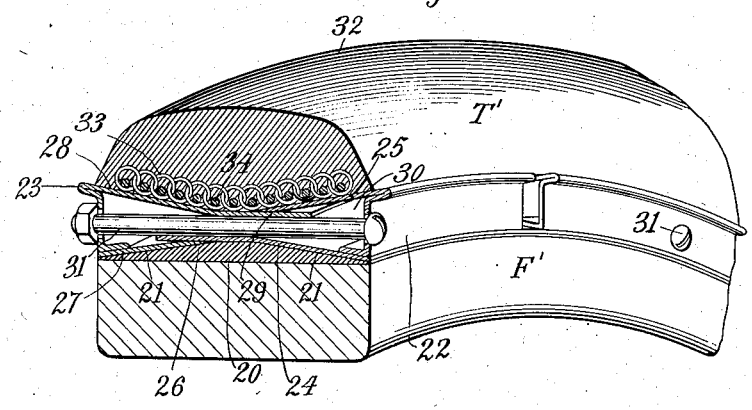

Referring to the drawings, in which corresponding parts are designated by similar characters of reference, Figure 1 is a perspective view of a section of wheel felly, rim, and tire constructed according to the present invention. Fig. 2 is a perspective view of a section of wheel felly, tire, and rim also constructed according to the present invention, but differing somewhat from those shown in Fig. 1.

Described in general terms, the invention comprises a resilient tire having embedded in the base thereof a reinforcing structure of special construction by means of which the base of the tire is rendered inextensible and laterally substantially incompressible and a rim including securing means whereby the tire is wedged securely in position upon the wheel-rim.

Referring to the drawings, F designates the felly of a wheel, and this is of the usual or any preferred construction. On the exterior of the felly F is secured a band or ring 1, which forms the main or fixed member of the rim. This band or ring presents an inner face 2, which is transversely flat, and an outer face presenting two portions 3, which are slightly inclined in opposite directions and serve as seating-surfaces for two wedging-rings 4, each of which is triangular in cross-section and is preferably formed hollow, as shown. The wedging-rings 4 may be secured in position in various ways; but I preferably employ a plurality of transverse bolts 5, which extend entirely across the band 1 and lie partially in transverse grooves provided to receive them. These bolts 5 afford means for drawing the wedging-rings tightly between the band or ring 1 and the base of the tire T, the base of the tire being constructed to present two divergent and slightly-inclined faces 6, thus leaving two spaces conforming substantially in cross-section to the wedging-rings 4 between the base of the tire and the band 1. When the wedging-rings 4, which are both transversely cut, as shown at 7, are wedged home between the band 1 and the tire T, they become slightly expanded to conform to the inclines 3, presented by the outer surface of the band, and the outer surfaces of the wedging-rings combine to present a shallow channel with gently-sloping diverging sides, in which the tire rests.

The tire itself may be of the solid, cushion, or pneumatic type; but the invention is primarily designed for embodiment in solid tires, and I have shown such tires only in the accompanying drawings, the changes necessary to adapt the invention to cushion or pneumatic tires being of such obvious character as to require no illustration or description.

The tire T may be of any suitable dimensions, depending upon the load to be carried and the conditions under which the vehicle is to be used; but in all cases the tire comprises a body 8, of rubber, and an embedded reinforcing or strengthening structure 9, which is located at the base of the tire and serves to determine the diameter of the tire at the base and its width at the base. This reinforcing structure 9 consists of a plurality of interlaced helices of wire (shown in Fig. 1 as having their axes extending transversely of the tire) and suitable reinforcing wires or cables 10, which extend circumferentially of the tire. These circumferential wires 10 lie between the whirls of the helices, and as they are inextensible the wires 10 prevent the tire from stretching at the base and offer a suitable resistance to the wedging action of the rings 4. The interlaced helices serve, primarily, to bind the rubber of the tire and the longitudinal wires 10 in association; but they also serve to space the wires at proper intervals and to determine definitely the width of the tire at the base. In the construction of the tire the reinforcing structure is thoroughly embedded in the rubber of which the tire is formed, and as the reinforcing structure is flexible, but is not extensible or laterally compressible to any considerable degree, it permits the tire to be easily applied to the rim of the wheel and gives definite form to the base of the tire, which rests in the shallow channel offered by the wedging-rings.

The application of the tire above described to the rim will be very readily understood from the drawings and the foregoing description. One mode of procedure is to slip the tire onto the main rim member 1 before either of the wedging-rings 4 is brought into position, then to introduce the wedging-rings into the spaces left between the tire and the main rim member 1 and force them home by means of the transverse bolts 5, which must be used in such a way as to effect a uniform wedging action around the entire wheel. To remove the tire, the operation above described is reversed. The bolts 5 are removed, and then the wedging-rings may be easily slipped off the wheel to permit the removal of the tire.

In the construction shown in Fig. 2 the felly F' is of ordinary construction, and the band or ring 20, which encircles the felly, is substantially the same as the band 1, above mentioned. The band 20 presents oppositely-inclined outer surfaces 21, which afford seats for wedging-rings 22 and 23, and these rings in turn offer a seat for the tire T'. The rings 22 and 23 differ somewhat in construction from the rings 4, above mentioned, these rings being arranged to overlap, as shown, and thus to offer a more complete seat for the base of the tire than those already described. The rings 22 and 23 are both rolled out of sheet metal, preferably steel, and are both transversely cut, so that expansion may take place when the rings are drawn together over the inclined faces 21 of the band 20. The ring 22 presents a wide inner portion 24 and a relatively narrow outer portion 25, the inner portion 24 comprising an inclined part, which corresponds to one of the inclined faces 21 of the band 20, and a horizontal part 26, which extends beyond the middle of the band 20 and overlies the lower portion of the ring 23. The ring 23, on the other hand, presents a relatively narrow lower portion 27, which is of about the same width as the adjacent inclined face 21 of the band 20 and a relatively wide upper portion 28, which includes besides the inclined part a horizontal extension 29, which supports the narrow upper portion 25 of the ring 22. Together the rings 22 and 23 inclose a chamber 30 of greater depth at the sides than in the middle, and through this chamber the transverse bolts 31, by which the wedging-rings are drawn home and secured, extend. As will be seen, the height of the chamber 30 in the middle is just sufficient to permit the bolts to be passed through it, and the bolts offer a solid support for the outer portions of the two rings.

The tire T', which is shown in Fig. 2, differs considerably in proportions from the tire T, (shown in Fig. 1,) as will be observed. The tire T' is much wider in proportion to its thickness than the tire T, and accordingly with a given load the pressure per unit of area on the tread of the tire will be less than on the tire T, if the tires be made of the same weight for wheels of the same diameter. Consequently there is less strain upon the rubber, of which the tire is composed, and a smaller degree of compression results. The tire T' consists of a body of rubber 32, as usual, and in the base, which presents two divergent and slightly-inclined surfaces, there is embedded a reinforcing structure 33, composed of a plurality of interlaced helices whose axes extend longitudinally in the tire and a plurality of inextensible wires or cables 34, which are threaded through the helices, as shown, and determine accurately the diameter of the tire.

The application of the tire to a wheel or its removal therefrom may be very easily accomplished, as will be evident from an inspection of the drawings. Ordinarily the wedging-ring 23 will be approximately seated upon the band 20, which is secured around the felly of the wheel. Then the tire will be applied to the ring 23, the relatively wide upper portion of which affords an adequate support for the tire. Finally, the wedging-ring 22 will be inserted between the band 20 and the base of the tire, when the tightening of the bolts 31 will draw the two rings together and cause the rings and the tire to become tightly wedged upon the periphery of the wheel. To remove the tire, the bolts 31 are removed and the wedging-rings may then be slipped out of position without difficulty, thereby effecting the removal of the tire with one of the rings.

While both forms of the invention illustrated in the drawings and described in the foregoing paragraphs comprise a pair of wedging-rings which are removable from the periphery of the wheel, and such construction is preferred, it will be obvious that one wedging ring in either form of the invention may be permanently secured upon the periphery of the wheel, and, if desired, be formed integral with the band which encircles the felly. I do not, therefore, limit myself to the exact construction shown and described, but reserve the right to make such changes therein as do not exceed the scope of the invention, which is hereinafter pointed out.

Having thus described my invention, what I claim as new, and desire to secure by Letters Patent, is—

1. A vehicle-wheel tire comprising a base presenting two outwardly and laterally inclined surfaces and having embedded in the base a circumferentially-inextensible reinforcing structure extending across the base and presenting two portions corresponding in position to the inclined surfaces of the base.

2. The combination with a tire having a base reinforced by a plurality of embedded helices of wire, of means for securing the tire upon a wheel, said means including a wedging-ring disposed between the base of the tire and the periphery of the wheel.

3. The combination with a tire of fixed diameter at the base and having the base reinforced by a plurality of embedded helices of wire, of means for securing the tire upon a wheel, said securing means including a wedging-ring disposed between the base of the tire and the periphery of the wheel.

4. The combination with a vehicle-wheel tire which is inextensible at the base and has the base reinforced by a plurality of embedded helices of wire, of means for securing the tire in position on a wheel, said securing means including a wedging-ring disposed between the tire and the periphery of the wheel, and a plurality of transverse bolts for drawing the wedging-ring home.

5. The combination with a tire having an inextensible base reinforced by a plurality of embedded helices of wire, of means for securing the tire upon a wheel, said securing means comprising a hollow wedging-ring disposed between the base of the tire and the periphery of the wheel.

6. The combination with a vehicle-wheel presenting an inclined surface on its periphery, of a tire having an inextensible base reinforced by a plurality of embedded helices of wire, a cut wedging-ring disposed between the inclined outer surface of the periphery of the wheel and the base of the tire, and means for forcing the wedging-ring home to secure the tire in position upon the wheel.

7. The combination with a vehicle-wheel presenting an inclined surface on its periphery, of a tire of resilient material having embedded in its base a plurality of interlaced helices of wire and an inextensible circumferential wire, a cut wedging-ring disposed between the inclined outer surface of the periphery of the wheel and the base of the tire, and means for forcing the wedging-ring home to secure the tire in position upon the wheel.

8. The combination with a vehicle-wheel presenting oppositely-inclined surfaces on its periphery, of a tire presenting divergent slightly-inclined surfaces at its base, a pair of overlapping wedging-rings disposed between the periphery of the wheel and the base of the tire, and means for drawing the wedging-rings together to secure the tire in position upon the wheel.

9. The combination with a vehicle-wheel, of a tire having an inextensible base, a pair of overlapping hollow wedging-rings disposed between the periphery of the wheel and the base of the tire and inclosing a chamber, and devices disposed in the chamber presented by said wedging-rings for drawing the rings together and thereby securing the tire in position upon the wheel.

In testimony whereof I have affixed my signature in the presence of two witnesses.

THOMAS MIDGLEY.

Witnesses:
J. BOSSEN,
D. W. PINNEY.